UNITED STATES PATENT OFFICE.

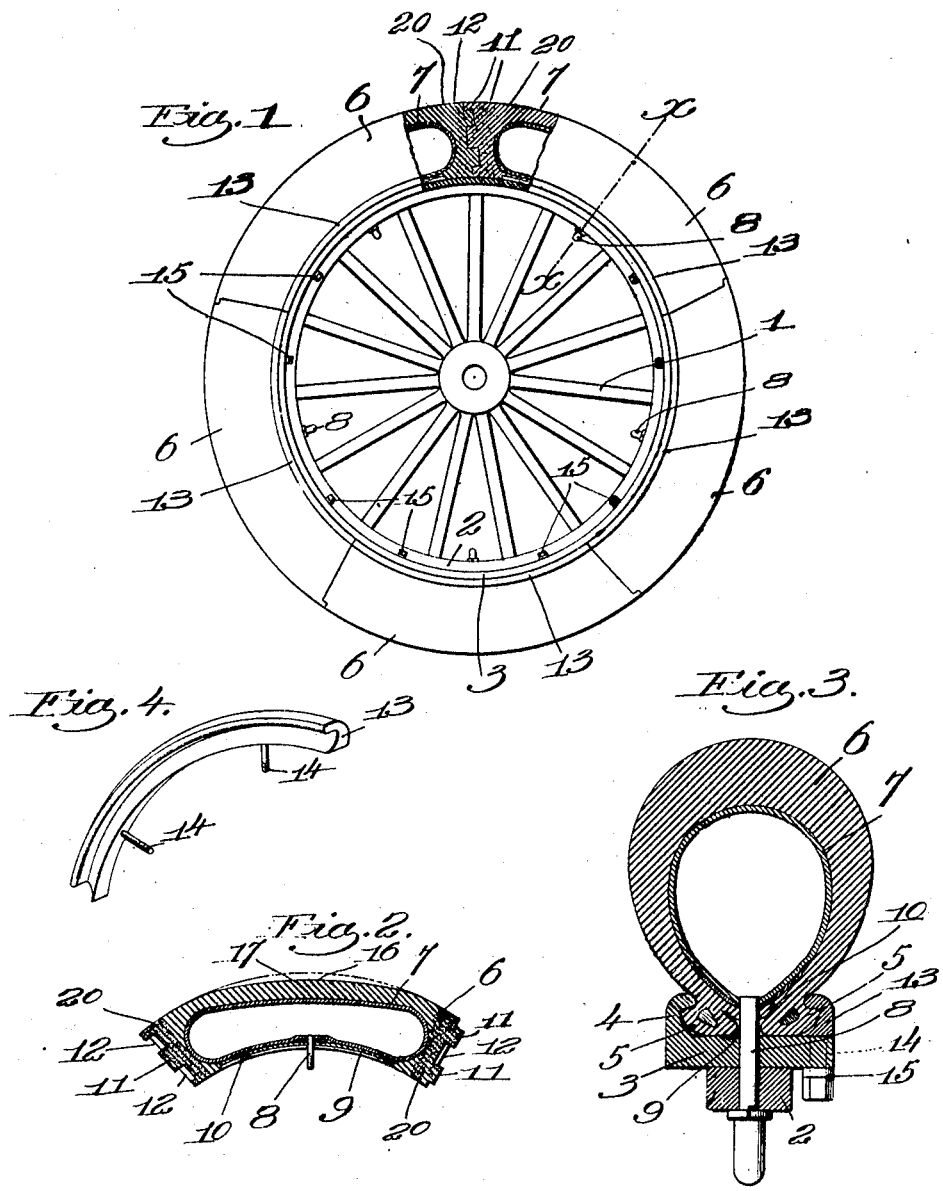

MORTON PEABODY PRINCE, OF CAMBRIDGE, AND CLEMENT M. BERNHEIMER, OF NEWBURYPORT, MASSACHUSETTS.

SECTIONAL PNEUMATIC TIRE.

1,054,312.  Specification of Letters Patent.  Patented Feb. 25, 1913.

Application filed January 15, 1912. Serial No. 671,381.

*To all whom it may concern:*

Be it known that we, MORTON PEABODY PRINCE, a citizen of the United States, residing at Cambridge, county of Middlesex, State of Massachusetts, and CLEMENT M. BERNHEIMER, a citizen of the United States, residing at Newburyport, county of Essex, State of Massachusetts, have invented an Improvement in Sectional Pneumatic Tires, of which the following description, in connection with the accompanying drawing, is a specification, like characters on the drawing representing like parts.

This invention relates to sectional pneumatic tires in which the tire is made of a plurality of separate sections capable of being independently inflated and deflated and removed from the rim of the wheel, and each comprising a shoe member and an inner air tube member, and the object of the invention is to provide a sectional tire of the character described, in which the sectional tire will be uniformly resilient throughout its length and provided with a maximum circumferential air support, which is substantially equal in riding effect to the tires having continuous shoes and continuous or one-piece inner air tubes. To this end, the individual shoe sections or members are provided with end walls which abut under the load of the vehicle so as to make a continuous shoe, and which are more resilient than the tread portions, so that the inner tube members within adjacent shoe members are enabled to have their ends brought nearer together when inflated and thus provide a maximum pneumatic support for the shoe members of the tire which approximates closely to the pneumatic support afforded by the one-piece inner air tube now commonly used, whereby the sectional pneumatic tire may have imparted to it the desirable easy riding feature of the one-piece tire having a continuous inner air tube, with the additional advantages resulting from the sectional construction of the tire in case of puncture or blow-out.

Referring to the drawings wherein we have illustrated the preferred embodiment of our invention Figure 1 is a side view of the tire embodying the invention with a part broken out; Fig. 2 is a longitudinal sectional view of one of the sections of the tire detached and deflated; Fig. 3 is an enlarged section on substantially the line *x—x*, Fig. 1; Fig. 4 is a view of the sectional clamping ring.

1 designates a wheel body which may have any suitable or usual construction and is shown as provided with the usual wooden felly 2. 3 is the felly band which is made in one continuous piece and which has integral therewith at one edge the flange 4 for gripping the bead or head 5 on the shoe of the tire. The tire is made of a plurality of independent sections, there being five such sections herein shown. Each section comprises an outer shoe member or casing 6 and an inner air tube member 7, each inner tube having a valve 8 associated therewith, the stem of which extends through the felly band and felly 2 and through which the inner tube can be inflated, as usual. Each shoe member 6 is provided on each edge thereof with the beads or heads 5, and on its inner side with a longitudinal slot 9 through which the inner tube 7 may be inserted into place. One side of each shoe member may be formed with a flap 10 which closes the slot 9, as shown in Fig. 3, and which prevents the inner tube from being forced out through the slot when said tube is inflated.

The tire sections are arranged end to end with the end walls of the shoe members abutting each other as usual in sectional tires. The meeting ends of the shoe members 6 are provided in the present instance with interlocking projections and recesses 11 and 12, the projections on one shoe member fitting the recesses on the other for the purpose of holding the ends of the shoe members in their proper position relative to each other. The shoe members are held in place by a sectional clamping ring formed of ring sections 13, each of which is of a length corresponding to that of the shoe member 6. These clamping ring sections 13 are arranged to clench over the beads 5 on one side of the shoe, and each section is provided with studs 14 extending therefrom, which studs pass through openings in the felly band 3 and are engaged by clamping nuts 15. The flange 4 and sectional rings 13 constitute a clencher rim for engaging the tire. Each clamping ring section 13 is independently removable and as each section corresponds to one of the tire sections it is possible to remove any tire section by simply removing the corresponding clamping ring section 13 without disturbing any of the other tire sections.

In sectional tires of the character described and known to us, there is necessarily a greater or less mass of solid rubber at the ends where the adjacent shoe members meet, and as a result the tire is less resilient at such points than it is at the points where the air chambers are situated because of the fact that the solid rubber has less resiliency than the air, and further because the inner air tubes of adjacent sections are substantially widely separated by the interposed mass.

The primary object of the present invention is to provide a sectional tire of the character described, which is of substantially uniform resiliency throughout its circumferential length and whose riding qualities approximate closely to the easy riding qualities of the ordinary pneumatic tire, which latter consists of a one-piece shoe and a continuous inner tube. In the present instance, we accomplish this end by forming the shoe members 6 with the end walls 20 thereof of softer or more resilient material than the intermediate tread portion thereof. For instance, in Figs. 1 and 2 the stippled or shaded parts of the shoe member indicate the portions which are softer or more resilient than the body or tread-portion of the shoe. This increase in the yielding quality of the material of the shoe member at the ends thereof can be secured either by making said ends of slightly different material or by controlling the vulcanizing process so that the ends or shaded portions of the shoe member 6 is treated differently. The particular manner of securing this increase in the yielding quality in the ends of the shoe members is not essential, the important point being a shoe member in which the ends thereof have a more yielding or pliant quality than the body or tread portion thereof.

In forming the shoe members 6 they may be molded with the longitudinal peripheral line 16 occupying normally a flatter curve than the periphery of the wheel when it is inflated and with the tread portion of the shoe thicker at its central portion, as at 17, than adjacent the ends. When the tire sections are inflated they tend to swell outwardly at their central portion, as shown in dotted line Fig. 2, and by molding them with the longitudinal peripheral curve 16 normally flatter than the true curve of the wheel, this tendency to swell outwardly will merely result in bringing the periphery of the wheel into a true circular shape. The extra thickness of the point 17 strengthens the shoe at this point and prevents it from bulging outwardly beyond the proper curve.

A sectional tire embodying our invention is uniformly resilient throughout its length due to the fact that the ends of the shoe members where they meet are made of material having greater yielding qualities than the portion of the shoe member inclosing the air chamber. By making the end walls of the shoe members more resilient than the tread portions of said members, the said end walls are capable of yielding under the air pressure in the air tube members and the latter are thus permitted to elongate, so that adjacent ends of the air tube members within adjacent shoe members are brought nearer to each other, which is permitted in the present instance, by the compression of said end walls in the direction of the length of said shoe members, and as a result the distance between adjacent inner air tube members is reduced and a circumferential air support for the tread portions of the sectional shoe or tire is obtained, which approximates closely to the air support of the continuous inner tubes of tires or shoes made in one piece and such as are now commonly used on automobiles. In other words, the present invention not only provides for eliminating the objectionable features of the continuous inner air tube and the continuous outer shoe, to-wit:—danger to life, delays, work and expense caused by blow-outs and punctures, but accomplishes this desirable result without sacrificing or appreciably diminishing the resiliency and easy riding of the continuous tire. In the present instance, we have illustrated one construction of shoe member or section by which this desirable result is obtained, but it is not desired to limit the invention to the particular construction shown. Moreover, by making the shoe sections of the shape shown in Fig. 2, the tire will preserve its true circle more nearly than if the shoe sections were molded in the first place to conform to the correct circle.

While we have illustrated herein one embodiment of our invention, we do not wish to be limited to the constructional details shown.

Having fully described our invention, what we claim as new and desire to secure by Letters Patent is:—

1. The combination with the rim of a vehicle wheel, of a pneumatic tire mounted on said rim and composed of a plurality of shoe members and separate inner air tube members within said shoe members and removable therefrom, said shoe members having end walls arranged to make contact under load and of greater resiliency than the intermediate tread portions to permit them to be moved by the air pressure within the inner tube members and thereby enable the inner tube members within adjacent shoe members to be elongated and brought substantially close together when inflated and thus obtain a maximum circumferential air support, which closely approximates in effect a continuous inner air tube, and means to detachably secure each shoe member on said rim to permit each shoe member to be removed from the rim independent of the other shoe members.

2. A sectional pneumatic tire composed of the plurality of separate shoe members and separate inner tube members within said shoe members and removable therefrom, said shoe members having end walls arranged to make contact under load, and of greater resiliency than the intermediate tread portions to permit them to be moved by the air pressure within the inner tube members and thereby enable the inner tube members within adjacent shoe members to be elongated and brought substantially close together when inflated and thus obtain a maximum circumferential air support which closely approximates in effect a continuous inner air tube.

3. A sectional pneumatic tire composed of a plurality of separate shoe members and separate inner air tube members within said shoe members and removable therefrom, said shoe members having end walls arranged to make contact under load and of softer material than the intermediate tread portions to permit them to be moved by the air pressure within the inner tube members and thereby enable the inner tube members within adjacent shoe members to be elongated and brought substantially close together when inflated and thus obtain a maximum circumferential air support which closely approximates in effect a continuous inner air tube.

4. A sectional pneumatic tire composed of a plurality of separate shoe members and separate inner air tube members within said shoe members and removable therefrom, said shoe members having yielding end walls of softer material than the intermediate tread portion and capable of being moved by the air pressure within the inner tube members to enable the inner tube members within adjacent shoe members to be brought substantially close together when inflated and thus obtain a maximum circumferential air support which closely approximates in effect a continuous inner air tube.

5. A sectional pneumatic tire having a plurality of separate shoe members provided with softer end walls than the intermediate tread portions and arranged in close proximity to one another to make contact under load.

In testimony whereof, we have signed our names to this specification, in the presence of two subscribing witnesses.

MORTON PEABODY PRINCE.
CLEMENT M. BERNHEIMER.

Witnesses:
Louis C. Smith,
Bertha F. Heuser.

---

Copies of this patent may be obtained for five cents each, by addressing the "Commissioner of Patents, Washington, D. C."